United States Patent
Khayatzadeh et al.

(10) Patent No.: US 12,181,910 B2
(45) Date of Patent: Dec. 31, 2024

(54) TIMING MARGIN SENSOR

(71) Applicant: SambaNova Systems, Inc., Palo Alto, CA (US)

(72) Inventors: Mahmood Khayatzadeh, Palo Alto, CA (US); Satyajit Sarkar, Palo Alto, CA (US); Jinuk Shin, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 143 days.

(21) Appl. No.: 18/104,233

(22) Filed: Jan. 31, 2023

(65) Prior Publication Data

US 2023/0251683 A1 Aug. 10, 2023

Related U.S. Application Data

(60) Provisional application No. 63/308,912, filed on Feb. 10, 2022.

(51) Int. Cl.
*G06F 1/08* (2006.01)
(52) U.S. Cl.
CPC ...................... *G06F 1/08* (2013.01)
(58) Field of Classification Search
CPC ... G06F 1/08; G06F 1/10; G06F 1/105; G06F 1/12; G06F 1/14
See application file for complete search history.

(56) References Cited

U.S. PATENT DOCUMENTS

| | | | | |
|---|---|---|---|---|
| 2006/0097767 A1* | 5/2006 | Lu | ............................ | G06F 1/06 327/291 |
| 2010/0256937 A1* | 10/2010 | McKay | ................ | G01R 31/002 324/96 |
| 2019/0339651 A1* | 11/2019 | Yao | ......................... | H03L 7/085 |
| 2019/0348989 A1* | 11/2019 | Janardhanan | ......... | G04F 10/005 |

* cited by examiner

*Primary Examiner* — Raymond N Phan
(74) *Attorney, Agent, or Firm* — Flagship Patents; Sikander M. Khan; Bruce A. Young

(57) ABSTRACT

A timing margin sensor circuit includes one or more time-to-digital converters (TDCs), a predictor, and a translation circuit. The TDC(s) measure(s) progress of a clock signal through one or more chains of delay stages. The progress depends on sense conditions acting upon the delay chain, such as the supply voltage and the temperature. The predictor receives the measured progress. If the delay chain becomes slower, the predictor extrapolates a predicted progress value. If the delay chain becomes faster, the predictor outputs the actual progress value. The translator translates the predictor output value to sense information that can be used in a clock stretcher circuit. The timing margin sensor may further have an averager/selector to average or select from the results of multiple TDCs. The timing margin sensor may further have a calibrator to compensate for nominal sense conditions, and one or more tunable delays circuits.

17 Claims, 3 Drawing Sheets

TIMING MARGIN SENSOR

CROSS-REFERENCES

This application claims the benefit of U.S. provisional patent application No. 63/308,912, entitled "Timing Margin Sensor," filed on Feb. 10, 2022. The priority application is hereby incorporated by reference herein for all purposes.

RELATED APPLICATIONS

This application is related to the following commonly owned applications:
 U.S. patent application Ser. No. 17/338,620, entitled "Variable-Length Clock Stretcher with Correction for Glitches Due to Finite DLL Bandwidth," filed Jun. 3, 2021, and issued as U.S. patent Ser. No. 11/323,124 on May 3, 2022;
 U.S. patent application Ser. No. 17/338,625, entitled "Variable-Length Clock Stretcher with Correction for Glitches Due to Phase Detector Offset," filed Jun. 3, 2021, and issued as U.S. patent Ser. No. 11/239,846 on Feb. 1, 2022;
 U.S. patent application Ser. No. 17/338,626, entitled "Variable-Length Clock Stretcher with Correction for Digital DLL Glitches," filed Jun. 3, 2021, and issued as U.S. patent Ser. No. 11/290,113 on Mar. 29, 2022;
 U.S. patent application Ser. No. 17/338,629, entitled "Variable-Length Clock Stretcher with Passive Mode Jitter Reduction," filed Jun. 3, 2021, and issued as U.S. patent Ser. No. 11/290,114 on Mar. 29, 2022; and
 U.S. patent application Ser. No. 17/405,913, entitled "Variable-Length Clock Stretcher with Combiner Timing Logic," filed Aug. 18, 2021, and issued as U.S. patent Ser. No. 11/334,109 on May 17, 2022.

The related applications are hereby incorporated by reference herein for all purposes.

BACKGROUND

Technical Field

The technology disclosed relates to clock timing in digital integrated circuits (ICs), and in particular to circuits and methods for measuring voltage and temperature to adjust a clock frequency to prevent signal timing violations.
Context
The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Digital integrated circuits, particularly synchronous digital circuits such as processors that rely on pipelined circuits, rely on a central clock signal that triggers pipeline flipflops within a clock domain. Signals travel through combinational logic between the pipeline flipflops. If the flipflops are clocked too fast then signals may not have enough time to travel through the combinational logic, and the IC may fail to perform its function correctly. Such a failure is known as a timing violation. If the flipflops are clocked too slowly, then the IC may not meet its performance targets.

It is possible to calibrate a clock frequency for parameters that are stable, such material parameters that depend on the production process (P). But other parameters, such as the supply voltage (V) and the die temperature or junction temperature (T), are not stable. Commonly, the process, supply voltage, and die temperature or junction temperature are known as the PVT conditions, and at the design stage circuits are simulated for correct behavior at the extremes ("corners") of the PVT conditions. A clock stretcher can be used to reduce the clock frequency when a sensor senses that the supply voltage or the temperature, or more generally the PVT conditions, change to levels that might cause a timing violation. Conventional sensors may do so, but they can be slow. To mitigate for slowness of a sensor, a system with a clock stretcher must allow for some extra margin, resulting in lost performance, or unnecessary high power dissipation.

SUMMARY

The technology disclosed relates to clock timing in digital integrated circuits (ICs), and in particular to circuits and methods for measuring voltage and temperature to adjust a clock frequency to prevent signal timing violations. Digital integrated circuits, particularly synchronous digital circuits such as processors that rely on pipelined circuits, rely on a central clock signal that triggers pipeline flipflops within a clock domain. Signals travel through combinational logic between the pipeline flipflops. If the flipflops are clocked too fast then signals may not have enough time to travel through the combinational logic, and the IC may fail to perform its function correctly. Such a failure is known as a timing violation. If the flipflops are clocked too slowly, then the IC may not meet its performance targets.

In a first aspect, an implementation provides a sensor circuit. The sensor circuit comprises a first time-to-digital converter (the first TDC), which has a first TDC clock input and a first TDC trigger input. The first TDC includes a chain of delay stages sensitive to a sense condition. The sense condition may include a process (P) condition, a supply voltage (V), a junction temperature, and/or a die temperature (T). The sensor circuit further has a predictor and a translation circuit. The predictor outputs a worst of a predicted value and an actual value. The translation circuit outputs sense info based on the predictor output signal.

The sensor circuit may further include a calibrator and a first tunable delay circuit. The calibrator takes a TDC output signal and compares it with a target code to produce an error signal. The error signal controls the delay of the first tunable delay circuit. An input clock signal travels via the tunable delay circuit to the clock input of the first TDC, which measures the delay that the input clock signal undergoes in the first tunable delay circuit.

A further implementation may include one or more additional TDCs and tunable delay circuits, and an averager/selector. The averager can average the output signals of the TDCs, or select one TDC output signal.

Particular aspects of the technology disclosed are described in the claims, specification and drawings.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope as claimed. Instead, they merely represent examples of different implementations of the technology.

DETAILED DESCRIPTION

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C.

Unless otherwise specified, the use of ordinal adjectives "first", "second", "third", etc., to describe an object, merely refers to different instances or classes of the object, and does not imply any ranking or sequence.

The term "coupled" is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetical, or mechanical, between the things that are connected, without any intervening things or devices.

Implementations

Figure 1:
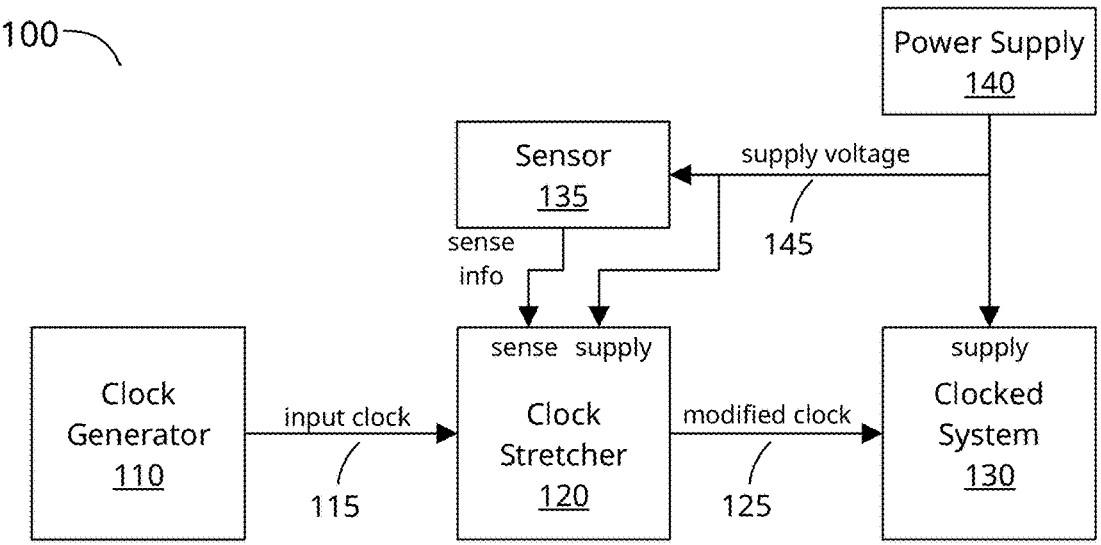
FIG. 1 illustrates an example system using a clock stretcher.

FIG. 1 illustrates a system 100 using a clock stretcher. System 100 includes clock generator 110, clock stretcher 120, clocked system 130, timing margin sensor 135 and power supply 140. Clock generator 110 generates input clock 115 which it forwards to clock stretcher 120. Timing margin sensor 135 senses supply voltage 145 and forwards sense information to clock stretcher 120, which temporarily lowers the frequency of the clock during a period of heavy loading, resulting in modified clock 125 which clock stretcher 120 forwards to clocked system 130. Power supply 140, which delivers supply voltage 145, powers clocked system 130 and in some implementations also clock stretcher 120. However, in other implementations, clock stretcher 120 may receive its supply power from another source or it may include an intervening voltage regulator.

The function of timing margin sensor 135 is to sense how much supply voltage 145 drops below its nominal value and deliver sense information to clock stretcher 120, so that clock stretcher 120 can lower the frequency of modified clock 125 accordingly to a value at which clocked system 130 can remain operating safely without experiencing timing violations and functional failures.

Clocked system 130 may be or include any digital or mixed-signal system that uses a clock signal for clocking synchronous digital logic circuits, and may include (part or all of) an IC, an SoC, an MCM, a PCB, or any other module that includes synchronous digital circuits. For example, clocked system 130 may include a chip with one or more processors, such as a CPU, GPU, or AI chip. Conversely, a chip with one or more processors may include one or more implementations of clocked system 130. Clock generator 110 may include an oscillator, such as a crystal oscillator, an LC oscillator, a ring oscillator, or any other oscillator; a frequency generator to take an oscillator output signal and generate a signal with another frequency, for example a much higher frequency; a buffer; and any other circuit to produce an input clock suitable for clocking clocked system 130. Power supply 140 may include a battery, a DC-to-DC converter, a voltage regulator, a current regulator, and/or any other circuit commonly used in the art to supply a clocked system with electric power. In some implementations, a single semiconductor chip, MCM, or PCB may include one or more of clock generator 110, timing margin sensor 135, clock stretcher 120, clocked system 130, and/or power supply 140.

Figure 2:
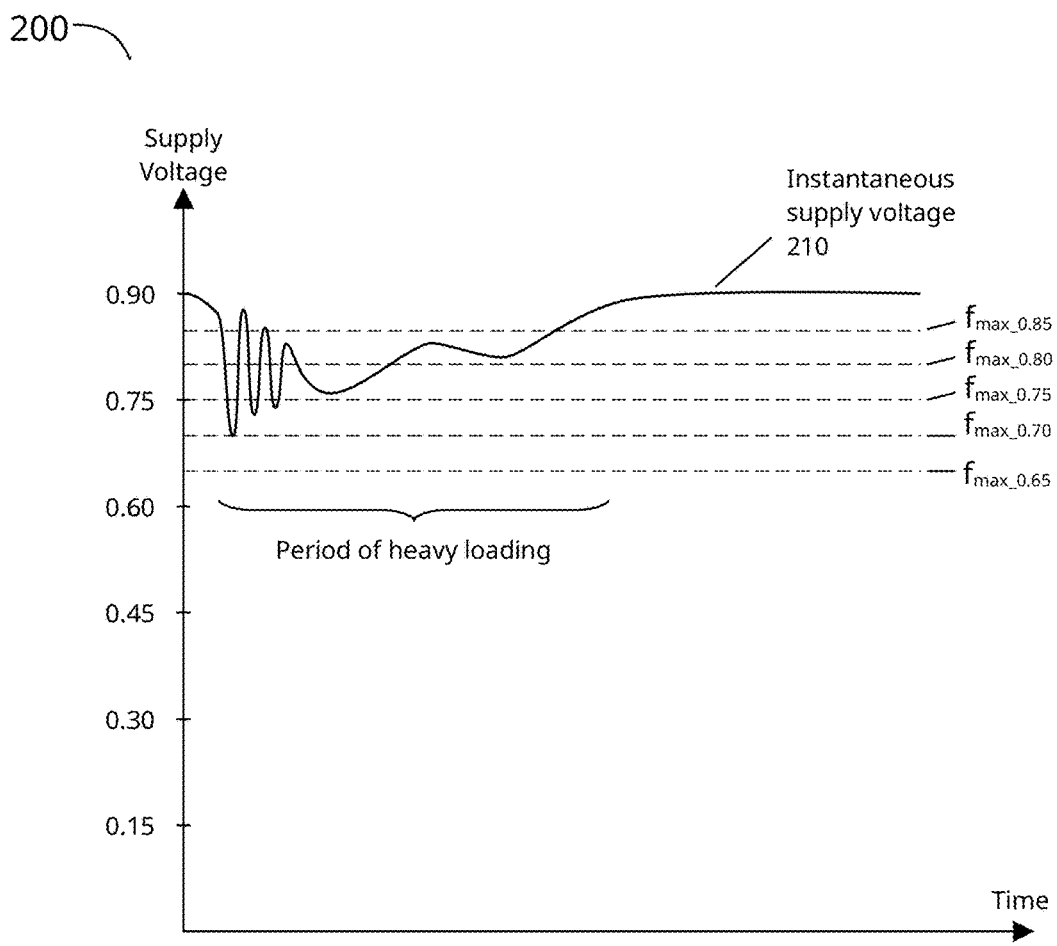
FIG. 2 illustrates that a period of heavy loading causes droops in the supply voltage, which may cause a clocked system to have a lower maximum operational clock frequency.

FIG. 2 illustrates that a period of heavy loading causes droops in the supply voltage, which may cause a clocked system to have a lower maximum operational clock frequency. Chart 200 shows an example of an instantaneous supply voltage 210 as a function of time, including a period of heavy loading. For example, if clocked system 130 includes one or more processors executing software or firmware instructions, then it is possible that during the period of heavy loading the software or firmware executes compute-intensive instructions requiring more current than power supply 140 can immediately deliver, resulting in a drop of the supply voltage. As corrective circuits within power supply 140 set in, the supply voltage may bounce up and down a few times before more slowly correcting back to the required supply voltage. The shape of instantaneous supply voltage 210, as a response to a period of heavy loading, may depend on many factors, including the characteristics of power supply 140, parasitics in the physical implementation of clocked system 130, and the instantaneous requirements posed by software being executed.

Clocked system 130 may require a nominal supply voltage of, for example, 0.9V to operate at its maximum clock frequency $f_{max}$. It may have been characterized or simulated to operate at a maximum clock frequency $f_{max\_0.85}$ when the supply voltage equals 0.85V. So when the supply voltage is nominally 0.9V it has a safety margin of 0.05V for operation at $f_{max\_0.85}$. At 0.8V, 0.75V, 0.7V and 0.65V it may have been characterized or simulated to operate at maximum clock frequencies $f_{max\_0.80}/f_{max\_0.75}/f_{max\_0.70}$, and $f_{max\_0.65}$, respectively. These respective frequencies are progressively lower for normal MOSFET semiconductor processes. I.e., if the supply voltage is lower, the maximum clock frequency is lower. If a synchronous digital circuit is operated at a frequency above its maximum clock frequency, timing violations and functional errors occur. Therefore, in the situation depicted in FIG. 2, during the period of heavy loading, instantaneous supply voltage 210 drops to as low as 0.7V, at which the clocked system 130 could only be safely operated at a clock frequency up to $f_{max\_0.65}$. Thus, to prevent failure due to the limitations of power supply 140, clocked system 130 needs to be operated at a clock speed significantly below its performance available at the full supply voltage of 0.9V.

Figure 3:
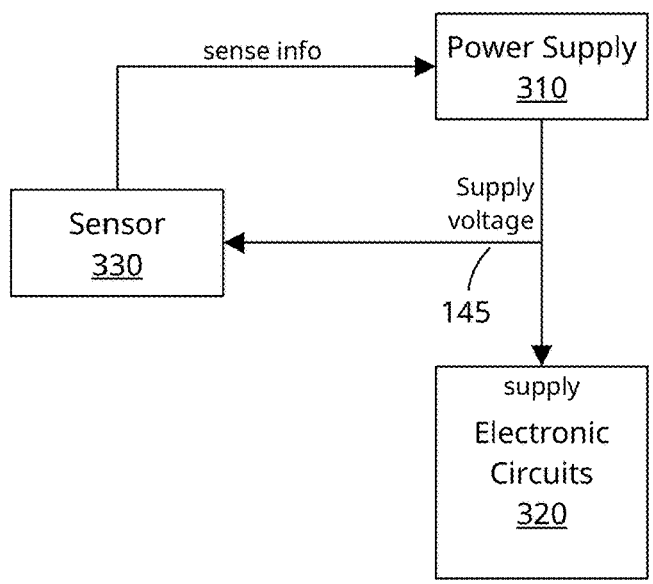
FIG. 3 illustrates an example system with a power supply.

FIG. 3 illustrates an example system 300 with a power supply 310. Power supply 310 may provide a supply voltage 145 to electronic circuits 320. Due to an internal or external condition (a sensed condition), supply voltage 145 may temporarily droop below a level at which electronic circuits 320 operate functionally correct. To prevent this droop, timing margin sensor 330 senses supply voltage 145 (and may sense other internal and/or external sense conditions) and delivers sense information back to power supply 310, which may use the sense information to source additional current, until the sensed condition is no longer present. The sense conditions may include material parameters that depend on the production process (P) and other parameters, such as the supply voltage (V) and the die temperature or junction temperature (T), jointly known as the PVT conditions.

An implementation may deliver the sense information in many different formats. The sense information may include one or more digital numbers, and each of the one or more digital numbers may be in a binary format, or in a thermometer code format (a series of "1"s followed by a series of "0"s or vice versa), or in any other format suitable for an application.

Whereas FIGS. 1 and 3 illustrate examples of systems that may use a timing margin sensor, other systems are also possible. For example, timing margin sensor 330 may not deliver the sense information to power supply 310, or to a clock stretcher, but to a dynamic voltage and frequency scaler (DVFS) that postprocesses the supply voltage delivered by power supply 310 and/or modifies the output frequency of the clock generator that clocks electronic circuits 320.

Figure 4:
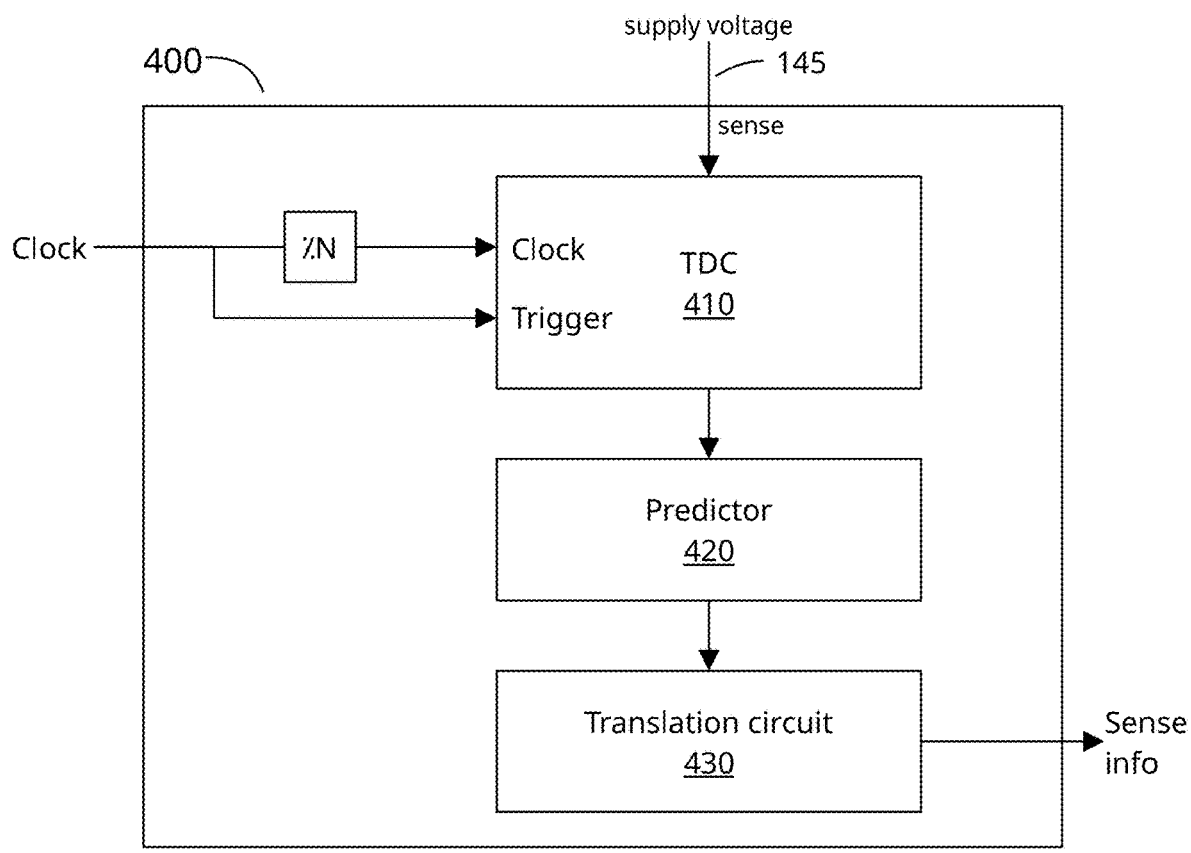
FIG. 4 illustrates an example timing margin sensor implementation.

FIG. 4 illustrates an example timing margin sensor 400 implementation. Timing margin sensor 400 includes a time-to-digital converter (TDC 410), a predictor 420, and a translation circuit 430, which may comprise a lookup table (LUT) or logic that otherwise converts the predictor results to sense information of a required format. TDC 410 has a clock input and a trigger input. It may include a chain of delay stages, through which signals presented at the clock input travel. The delay of the signals traveling through the chain of delay stages is sensitive to one or more sense conditions. When the TDC is triggered (its trigger input is asserted), it measures the progress of an input clock pulse traveling though the delay stages, and outputs that progress as a number. An implementation may divide the input signal for the TDC clock by an integer N, for example N=2 or N=3, so that for each clock signal received at the TDC clock input, TDC 410 receives a trigger pulse at what should be partway its cycle. The first trigger pulse starts the clock pulse traveling through the delay chain, and the second trigger pulse captures its progress. If the clock signal has a stable frequency and internal and external conditions (the sense conditions) of TDC 410 are unchanged, then the progress measured for successive pulses is the same. The sense conditions on which progress measured depends include the design of the chain of delay stages, as well as the process/voltage/temperature (PVT) conditions. They may also include other factors, such as mechanical stress on the semiconductor die. The design is fixed and process conditions may take years to change, so the chain of delay stages acts in the short term as a sensor for its supply voltage and the die temperature at the location of the chain. Given a temperature and supply voltage, the chain of delay stages measures the PVT conditions and any changes in the process. TDC 410 outputs the measured progress to predictor 420, which is a measure for the sense conditions. Predictor 420 predicts a value for the measured progress, i.e., for future internal and external conditions, and generally outputs a value that represents the worse of the current and predicted value for the measured progress. This allows an application to prevent problems when conditions get worse, and to allow the application better performance as conditions get better.

In an example implementation, predictor 420 determines if the currently measured progress is slower than the last measured progress. If so, predictor 420 outputs a predicted value for the measured progress. But if the current measured progress is faster than the last measured progress, predictor 420 outputs the currently measured progress. Predictor 420 may calculate the predicted value as a linear extrapolation of the current and last measured progress, or it may take several successive measurement results and perform a polynomial extrapolation, or any other type of extrapolation or prediction known in the art. Since a clocked system, as shown in FIGS. 1-2, can suffer from timing violations if the supply voltage drops too much, predictor 420 catches up real-time when conditions are improving (e.g., the supply voltage is increasing), and it outputs a prediction when conditions are deteriorating (e.g., the supply voltage is decreasing). Since the chain of delay stages may have the same gates (e.g., with standard, low, and/or high threshold voltages) as the clocked system, and it is on the same die, the PVT conditions in the delay stages are comparable to the PVT conditions in the clocked system, and the speed of signal progress in the delay chain is an indicator of the speed of signal progress in the clocked system. By predicting deteriorating conditions, timing margin sensor 400 can prevent problems. By tracking improving conditions, timing margin sensor 400 allows a clocked system to always perform at near-optimal speed.

Some implementations change the strength of prediction performed by predictor 420 based on the sensed signal. For example, a prediction may be more aggressive when supply voltage 145 is high and/or falling, and less aggressive when supply voltage 145 is low and/or rising. Under some conditions, an implementation may not predict, and predictor 420 passes only actual measured values. In other conditions, an implementation may predict aggressively. And in conditions in between, an implementation may predict conservatively.

Translation circuit 430 uses the signal output by predictor 420 to find and output sense information needed for the internal operation of the clock stretcher, which may include one or more binary numbers, thermometer codes, and/or other codes. Thus, translation circuit 430 translates the actual or predicted conditions into sense information that is relevant for a particular application. In some implementations, translation circuit 430 includes a lookup table (LUT). In other implementations, translation circuit 430 comprises, for example, one or more comparators that may have hysteresis and/or adjustable thresholds to determine sense information in a format that is useful for a particular situation.

Some implementations may need to operate in various sets of conditions, such as may be the case in systems that perform dynamic voltage and frequency scaling (DVFS). Such systems dynamically change a processor's (or other circuit's) supply voltage and clock frequency, dependent on presently needed performance levels. When high performance is needed, the processor or circuit receives a high supply voltage and a high clock frequency, and when lower performance is needed, the system dynamically reduces the supply voltage and the clock frequency to save power. To support this, translation circuit 430 may store or generate several sets of sense info parameters, and is addressed by both the output signal of predictor 420 as well as one or more bits that indicate which level of DVFS is applied.

Figure 5:
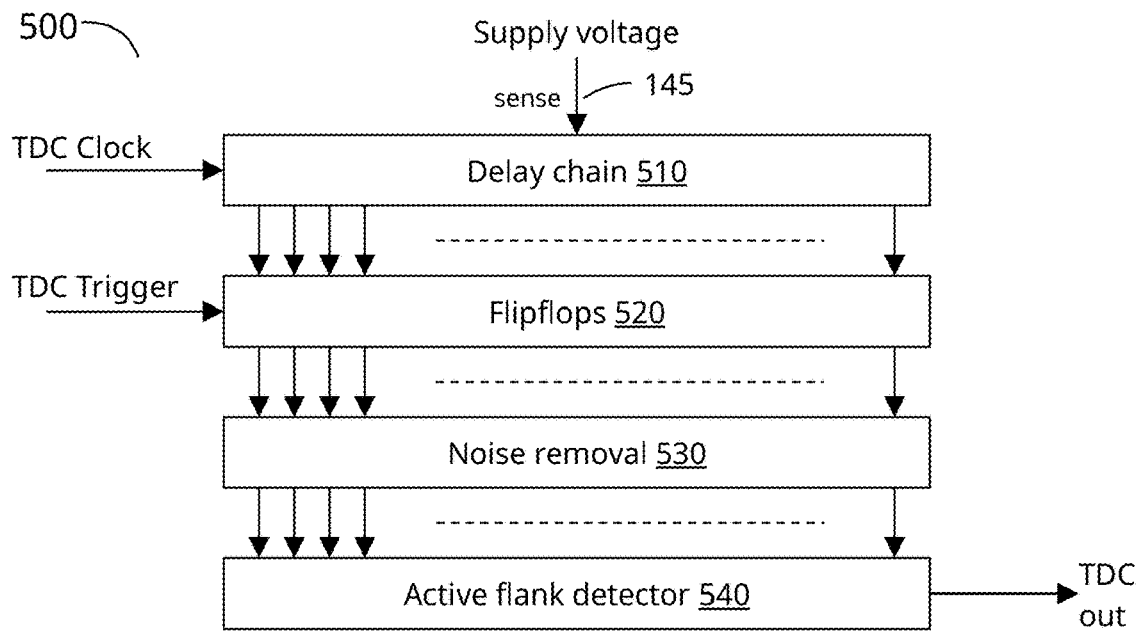
FIG. 5 illustrates an example time-to-digital converter (TDC).

FIG. 5 illustrates an example time-to-digital converter (TDC 500). TDC 500 includes a chain of delay stages (delay chain 510), at least a part of which have outputs directly coupled with inputs of a chain of flipflops 520. Each flipflop in chain of flipflops 520 is triggered by the signal on the TDC trigger input, so that all flipflops trigger at substantially the same time, and their states are an indication of progress of a signal travelling through delay chain 510 at the time of triggering. However, signals travel very fast through delay chain 510, and thus the flipflops need to react very fast when triggered. Some flipflops may be faster than others due to production variations and other factors. In some circumstances, a slow flipflop may output a faulty signal. Thus, there may be noise frozen in the captured progress at the outputs of chain of flipflops 520. Various techniques are known in the art for removing the noise, such as bubble removal, and noise removal circuit 530 corrects identifiable errors. It outputs a corrected progress signal, for instance in the format of a thermometer code, which it forwards to active flank detector 540. The corrected progress signal indicates a detected active flank.

Active flank detector 540 converts the corrected progress signal to a binary number. It may do so, for example, using a thermometer-to-binary converter, or an edge detector followed by a one-hot-to-binary converter. The result is a signal, for example a binary signal, that indicates the progress of the signal traveling through delay chain 510.

Figure 6:
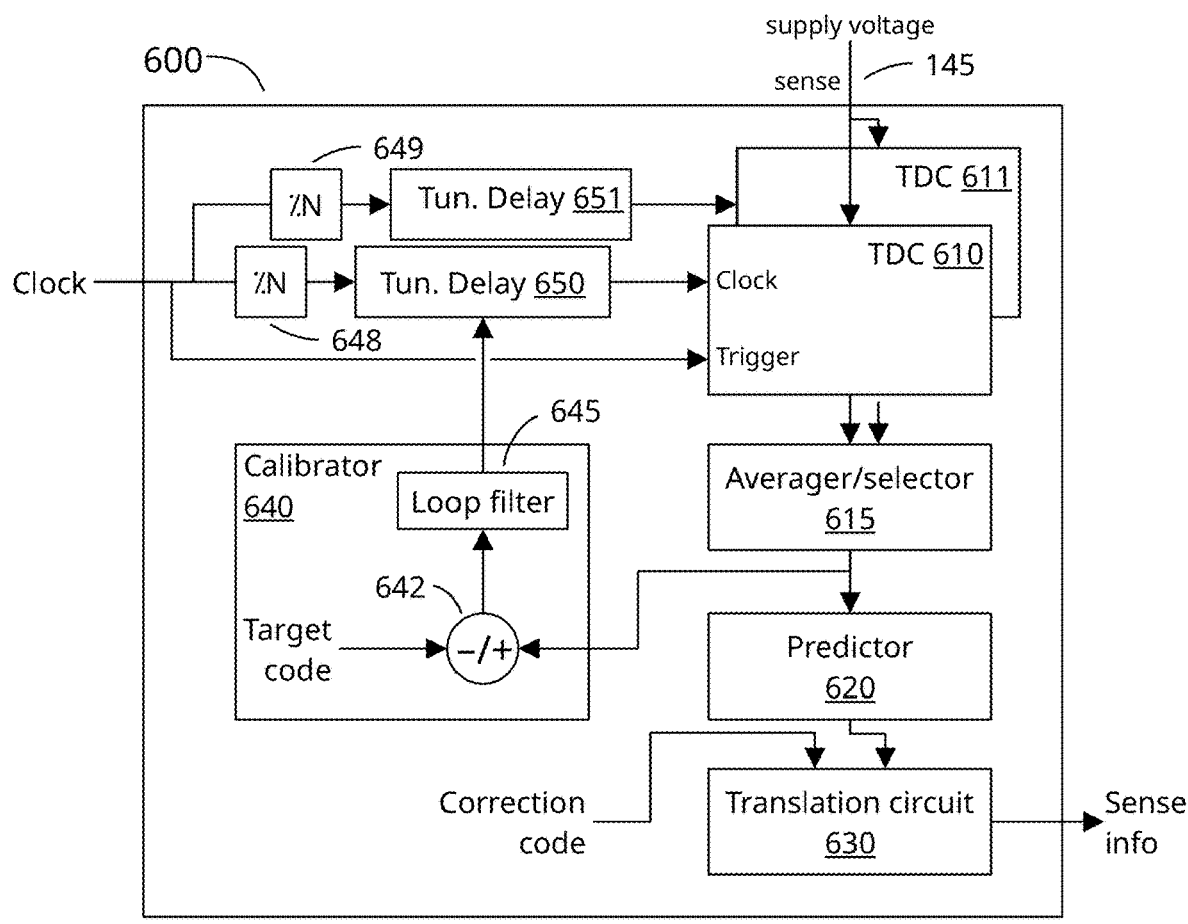
FIG. 6 illustrates another example implementation of a timing margin sensor.

FIG. 6 illustrates another example implementation of a timing margin sensor 600. Timing margin sensor 600 includes first TDC 610, second TDC 611, averager/selector 615, predictor 620, translation circuit 630, calibrator 640 with comparator 642 and loop filter 645, first tunable delay 650 and second tunable delay 651. The timing margin sensor 600 clock input receives a clock signal, and forwards it to the TDC trigger input of first TDC 610 and to the TDC trigger input of second TDC 611. The implementation may divide the clock signal by an integer N, where N∈{1, 2, 3, . . . } in divider 648 and divider 649, and forwards the resulting lower-frequency clock signals to first tunable delay 650 and second tunable delay 651. In some implementations, divider 648 and divider 649 are combined into a single divider, whereas in other implementations, divider 648 and divider 649 may be 180 degrees out of phase. From first tunable delay 650 the delayed lower-frequency clock signal is forwarded to the TDC clock input of first TDC 610, and from second tunable delay 651 the delayed lower-frequency clock signal is forwarded to the TDC clock input of second TDC 611. In some implementations, first tunable delay 650 and/or second tunable delay 651 are tunable in coarse and medium steps (compared with the fine resolution of first TDC 610 and second TDC 611) to allow for long-term calibration, to adjust for the operating frequency, and to roughly set the idle value of a TDC to a predefined value) as well as short-term adjustments. First TDC 610 and second TDC 611 have their outputs coupled with inputs of averager/selector 615, which may average the output signals of the connected TDCs, or select between them. Averager/selector 615 provides its output signal to calibrator 640 and to predictor 620, whose output is coupled with translation circuit 630. Translation circuit 630 outputs the sense information, which timing margin sensor 600 forwards to its output. Calibrator 640 compares the output signal of predictor 620 with a target code in comparator 642. In some implementations, comparator 642 comprises a subtractor. Comparator 642 outputs an error result, which the implementation filters in loop filter 645. It forwards the filtered result to first tunable delay 650 and second tunable delay 651, where the filtered result is used as a setting that determines the delay in each of the tunable delays. By calibrating the tunable delays when there is a known nominal supply voltage and nominal die temperature, stable parameters such as the process conditions can be compensated for. By calibrating the system for one or more stable parameters, it is possible to obtain a wider voltage observation range and reduce the chances of missing a voltage fluctuation that exceeds the voltage observation range.

Some implementations may invert the signal traveling through second tunable delay 651 into second TDC 611, so that first TDC 610 measures the progress of rising edges and second TDC 611 measures the progress of falling edges (the inverter to invert the signal is not shown in FIG. 6). Other implementations may have more than two tunable delays and TDCs, and TDCs may measure progress in different types of gates (low/standard/high threshold voltage, etc.).

Some implementations support operation at multiple combinations of supply voltage and frequency, which may require multiple sets of sense information. Whereas the target code allows an implementation to be calibrated at a single supply voltage/frequency combination, a correction code allows for supporting multiple sets of sense information, dependent on the selected voltage/frequency combination. The correction code is added to the address bits of translation circuit 630, so that an address of translation circuit 630 comprises both the bits of the predictor 620 output signal and the bits of the correction code.

As in some implementations translation circuit 630 outputs a thermometer code, a system that includes multiple instances of timing margin sensor 600 may determine a worst measured (or predicted) result by performing a logic OR operation on the output signals (sense information) of the multiple instances. Translation circuit 630 uses the signal output by predictor 620 to find and output sense information needed for the internal operation of the clock stretcher, which may include one or more binary numbers, thermometer codes, and/or other parameters. Thus, translation circuit 630 translates the actual or predicted conditions into sense information that is relevant for a particular application. In some implementations, translation circuit 630 includes a lookup table (LUT). In other implementations, translation circuit 630 comprises, for example, one or more comparators that may have hysteresis and/or adjustable thresholds to determine sense information in a format that is useful for a particular application.

Some implementations change the strength of prediction performed by predictor 620 based on the measured signal, i.e., based on the sense condition. For example, a prediction may be more aggressive when supply voltage 145 is high and/or falling, and less aggressive when supply voltage 145 is low and/or rising. Under some conditions, an implementation may not predict, and predictor 620 passes only actually measured values. In other conditions, an implementation may predict aggressively. And in conditions in between, an implementation may predict conservatively.

Blocks that timing margin sensor 600 has in common with timing margin sensor 400 have the same function as the respective blocks in FIG. 4.

Considerations

We describe various implementations of a timing margin sensor.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. Implementations may be as a single chip, or as a multi-chip module (MCM) packaging multiple semiconductor dies in a single package. All such variations and modifications are to be considered within the ambit of the present invention the nature of which is to be determined from the foregoing description.

Any suitable technology for manufacturing electronic devices can be used to implement the circuits of particular implementations, including CMOS, FinFET, BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

Particular implementations may be implemented by using application-specific integrated circuits, programmable logic devices, field-programmable gate arrays, optical, chemical, biological, quantum or nanoengineered systems, etc. Other components and mechanisms may be used. In general, the functions of particular implementations can be achieved by any means as is known in the art.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A sensor circuit, comprising:
   a first time-to-digital converter (the first TDC) with a first TDC clock input and a first TDC trigger input, wherein the first TDC includes a chain of delay stages sensitive to a sense condition;
   a predictor coupled with an output of the first TDC and configured to output a worst of a predicted value and an actual value; and
   a translation circuit with a first input coupled with an output of the predictor and with a data output coupled with an output of the sensor circuit.

2. The sensor circuit of claim 1, further comprising:
   a calibrator coupled with the output of the first TDC; and
   a first variable delay circuit, coupled between a sensor circuit clock input and the first TDC clock input, and with a calibration input coupled with an output of the calibrator, wherein the first variable delay circuit delays an input clock signal with a delay time that depends on a calibrator output signal.

3. The sensor circuit of claim 1, further comprising:
   a divider coupled between a clock input of the sensor circuit and the first TDC clock input.

4. The sensor circuit of claim 1, wherein the predictor outputs a predicted TDC output value when a current TDC output value is decreasing and to output the current TDC output value when the current TDC output value is increasing.

5. The sensor circuit of claim 1, wherein the predictor has a prediction strength based on a level of the sense condition.

6. The sensor circuit of claim 1, wherein the translation circuit receives a correction code on a second input.

7. The sensor circuit of claim 1, wherein the translation circuit outputs one of a thermometer code and a binary number.

8. The sensor circuit of claim 1, wherein the translation circuit comprises a lookup table.

9. The sensor circuit of claim 1, wherein the translation circuit comprises and or more comparators, and wherein a comparator has an adjustable threshold.

10. The sensor circuit of claim 1, further comprising:
    a second TDC with a second TDC clock input and a second TDC trigger input; and an averager/selector, with inputs coupled with the output of the first TDC and an output of the second TDC, and operable to average first TDC and second TDC output signals, and/or to select either an output signal of the first TDC or an output signal of the second TDC, wherein an output of the averager/selector is coupled with the predictor.

11. The sensor circuit of claim 1, wherein the first TDC comprises:
a series of flipflops coupled with at least a part of the chain of delay stages, and with clock inputs coupled with the first TDC trigger input;
a noise removal circuit coupled with outputs of the flipflops, and operative to remove faulty flipflop output signals; and
an active flank detector circuit coupled with outputs of the noise removal circuit, having an output with an output signal that indicates a location of a detected active flank.

12. The sensor circuit of claim 1, wherein:
the sense condition comprises at least one of a process corner, a supply voltage, a junction temperature, or a die temperature.

13. The sensor circuit of claim 2, wherein the calibrator comprises:
a comparator to compare a target code with a calibrator input signal; and
a loop filter coupled between a subtractor output and the output of the calibrator.

14. The sensor circuit of claim 13, wherein the comparator comprises a subtractor.

15. The sensor circuit of claim 11, wherein:
the active flank detector circuit comprises a thermometer-to-binary converter.

16. The sensor circuit of claim 14, further comprising:
a calibrator coupled with an output of the predictor;
a first variable delay circuit, coupled between a sensor circuit clock input and the first TDC clock input, and with a calibration input coupled with an output of the calibrator, wherein the first variable delay circuit delays an input clock signal with a first delay time that depends on a calibrator output signal; and
a second variable delay circuit, coupled between the sensor circuit clock input and a second TDC clock input, and with a calibration input coupled with an output of the calibrator, wherein the second variable delay circuit delays an input clock signal with a second delay time that depends on the calibrator output signal.

17. The sensor circuit of claim 14, wherein:
the second variable delay circuit delays an inverted input clock signal with the second delay time that depends on the calibrator output signal.

* * * * *